Dec. 10, 1968    R. S. ZOLUDOW    3,415,282
PNEUMATIC DIVERTING RELAY
Filed Nov. 23, 1965    6 Sheets-Sheet 1

INVENTOR
Richard S. Zoludow

BY *Birch and Birch*
ATTORNEYS

INVENTOR
Richard S. Zoludow

BY *Birch and Birch*

ATTORNEYS

INVENTOR
Richard S. Zoludow

Dec. 10, 1968

R. S. ZOLUDOW 3,415,282

PNEUMATIC DIVERTING RELAY

Filed Nov. 23, 1965

INVENTOR
Richard S. Zoludow

BY Birch and Birch
ATTORNEYS

Dec. 10, 1968    R. S. ZOLUDOW    3,415,282
PNEUMATIC DIVERTING RELAY
Filed Nov. 23, 1965    6 Sheets-Sheet 6

INVENTOR
Richard S. Zoludow

BY *Birch and Birch*
ATTORNEYS

United States Patent Office 3,415,282
Patented Dec. 10, 1968

3,415,282
PNEUMATIC DIVERTING RELAY
Richard S. Zoludow, South Bend, Ind., assignor to Robertshaw Controls Company, Richmond, Va., a corporation of Delaware
Filed Nov. 23, 1965, Ser. No. 509,403
3 Claims. (Cl. 137—625.48)

ABSTRACT OF THE DISCLOSURE

A pneumatic fast acting diverting relay with an intercoupled arrangement of two spring loaded valve assemblies in a single valve body and one of the valves serving to activate or deactivate the second spring loaded valve, which second valve controls a multiway flow from a plurality of ports.

---

The present invention relates generally to pneumatic relay means and more particularly to a penumatic diverting relay.

An object of the invention is to combine in a unitary body a signal valve assembly operatively connected to activate a multiway control valve assembly.

Another object is to provide a penumatic fast acting diverting relay under command of a signal pressure spring biased valve.

Still another object is to provide a penumatic diverting relay adapted to be adjusted to cycle at a desired signal pressure from an inactive condition through active to a return inactive condition.

Yet another object is to provide a three way or a four way diverting relay as desired.

With these and other objects in view which will become apparent as my invention is fully understood, the same resides in the novelty of construction, combination and arrangement of elements hereinafter described in detail and distinctly claimed in the appended claims.

The description should be read in conjunction with the accompanying drawings of one embodiment of my invention in which like characters of reference designate like or similar elements throughout the several views.

Figure 1:
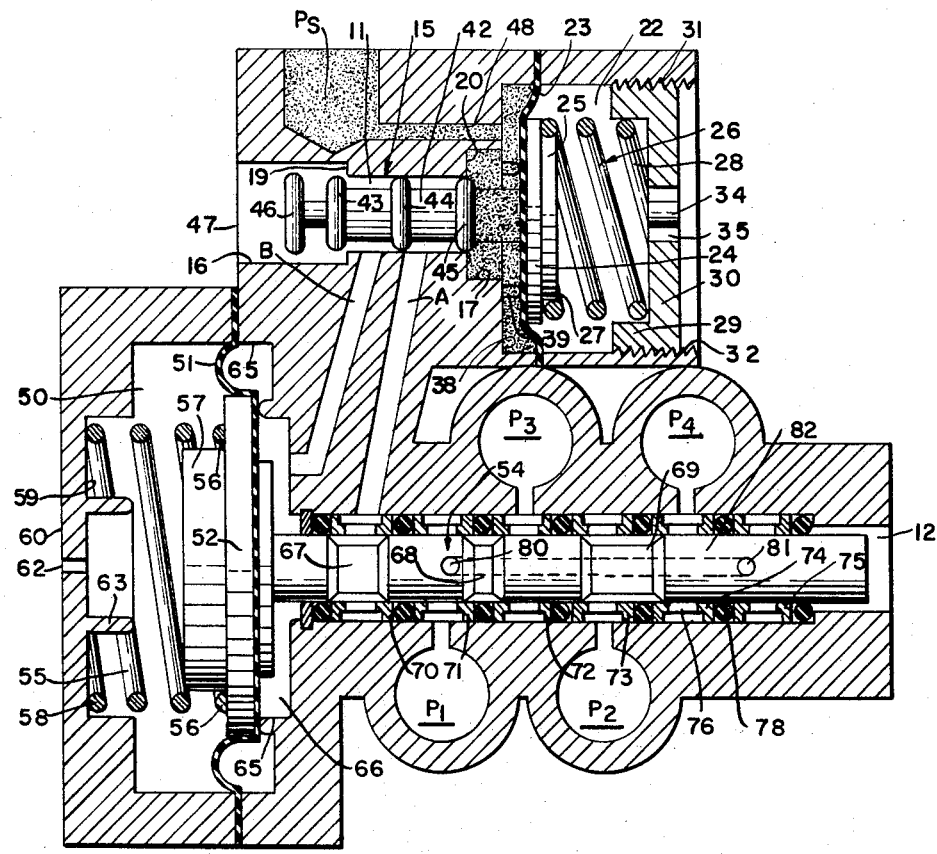
FIGURE 1 is a cross section view showing the present novel pneumatic diverting relay in the starting or deactivated position thereof.
Figure 6:
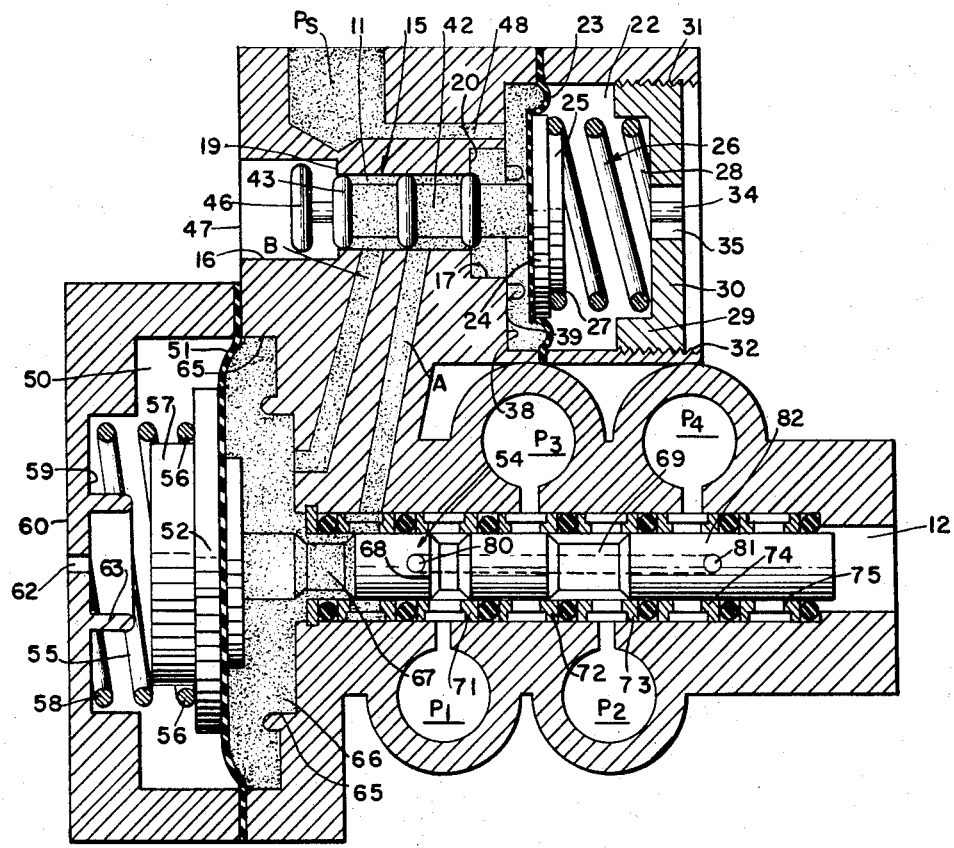
Figure 7:
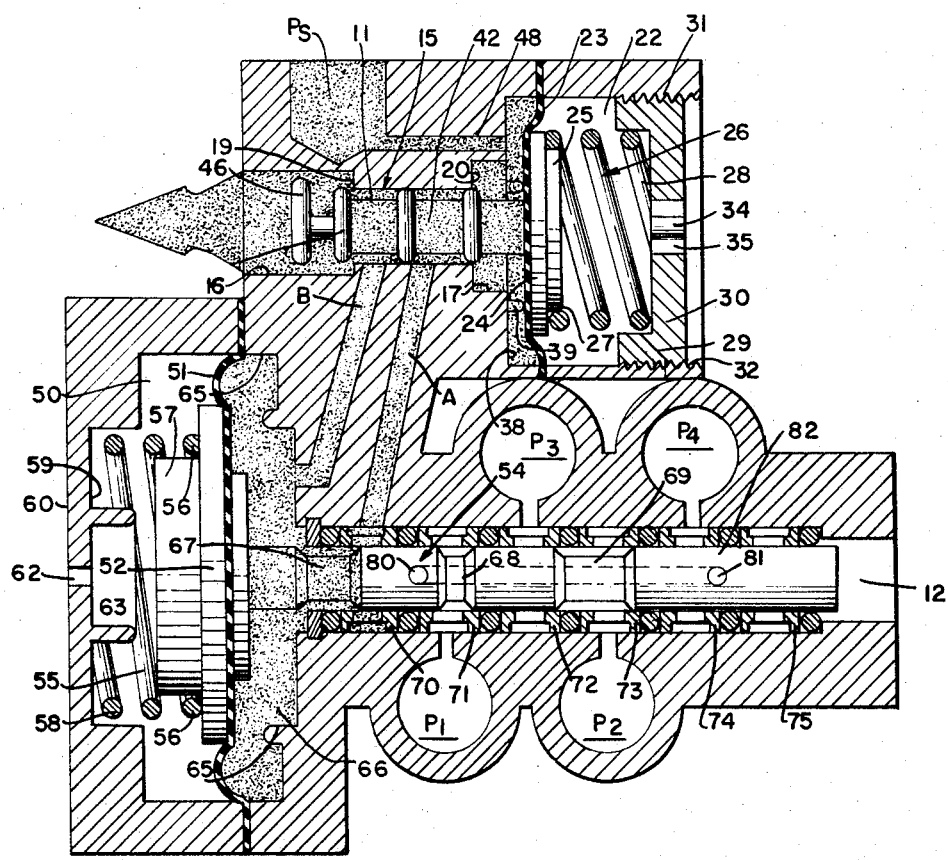

FIGURE 6 shows the signal valve position for sealing off the channels to the diverting valve and its associated pressure chamber with the spring in the signal valve chamber beginning to overcome the signal pressure; and FIGURE 7 illustrates the return position of the respective valve assemblies when the flow channels between the valve assemblies is vented, whereby the diverter valve rapidly moves into the FIGURE 1 deactivated position.

Figure 8:
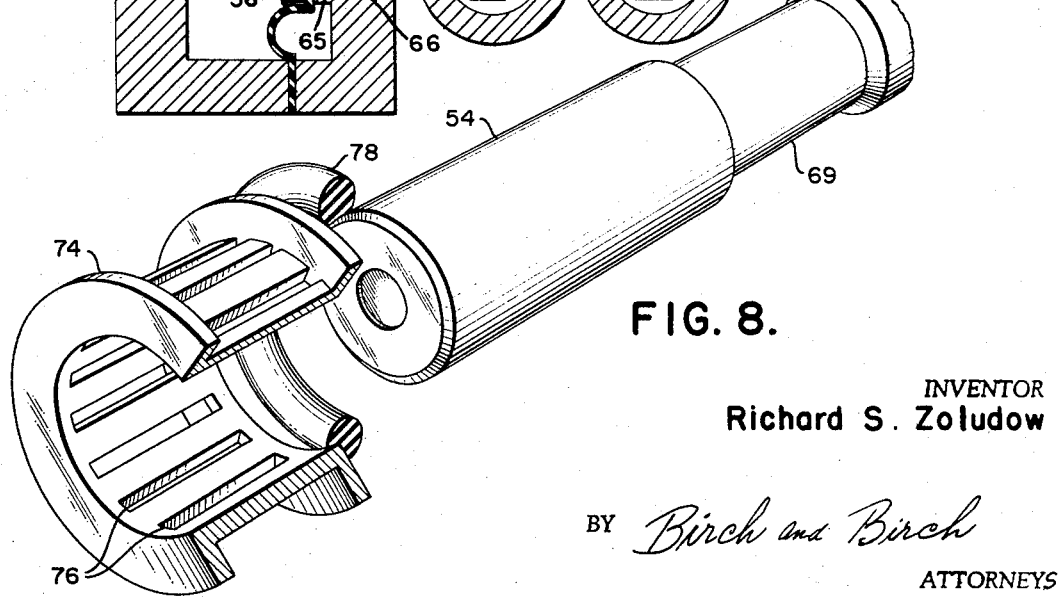
Figure 4:
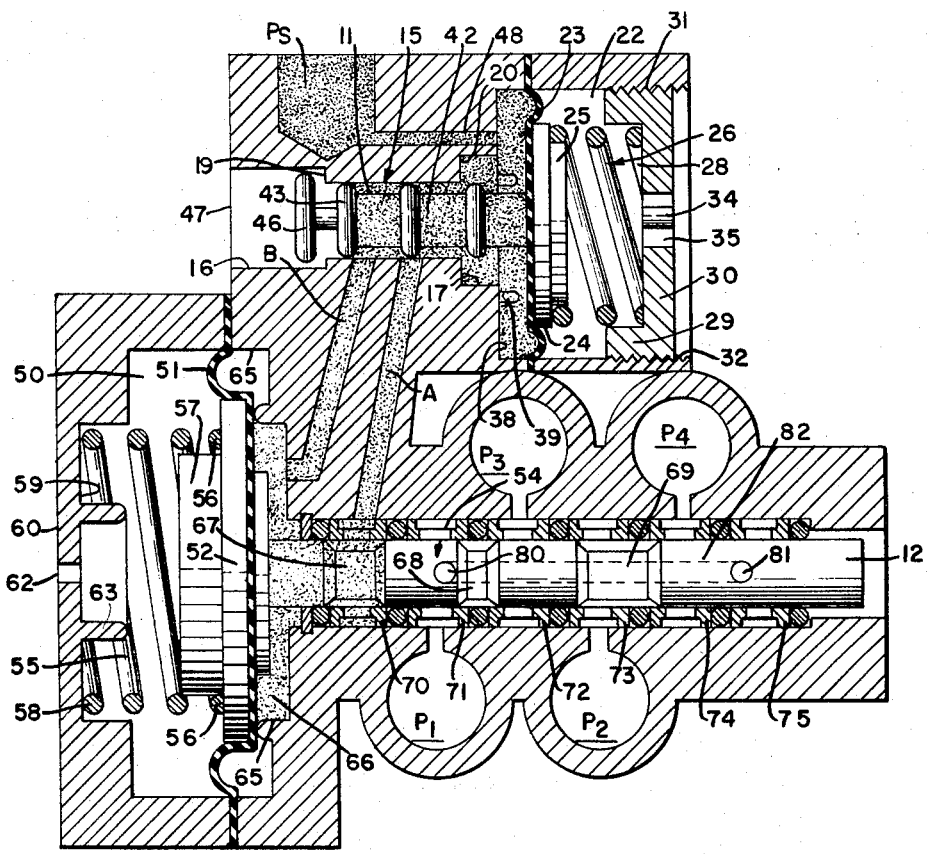
FIGURE 4 illustrates the signal valve position change as pressure builds up during operation.

FIGURE 8 is a perspective view of a portion of the diverter valve and a single spacer.

Referring to the drawings and first with particular reference to FIGURE 1, the diverting relay comprises a a body 10 having upper and lower portions with transverse bores 11 and 12 formed therein. The upper portion is counterbored to form a relatively small center cylinder 15 between relatively larger cylinders 16 and 17 at each end with annular lands 19 and 20 respectively defining the juncture of the surfaces 16 and 17 with each respective end of the smaller cylinder 15.

The cylinder 17 opens into a chamber 22. This chamber is divided by a diaphragm 23 in sealed connection with a spring carrier disc 24 formed with a relatively smaller spring centering means, such as a button 25. The button 25 projects into the endmost coil 27 of a coil spring 26 which coil seats on the peripheral face of the disc 24 opposite to the diaphragm side thereof and which has the endmost coil 28 embraced by a flange 29 formed at the inner peripheral edge of a disc plug 30 formed with exterior threads 31 which mate with threads 32 formed in the cylindrical wall of the chamber 22. The disc plug 30 is formed with a central opening 34 in which is mounted a hollow bushing 35 of suitable material, whereby the chamber 22 may be vented to atmosphere at various diaphragm positions.

On the wall 38 of the chamber 22 are valve stops 39 adapted to stop the spring carrier disc 24.

The disc 24 has operatively secured concentrically thereto a valve means 42 of the spoon type and has at predetermined spaced positions annular sealing rings or ridges 43, 44 and 45 and at its free end a button headed valve stop means 46. These sealing rings are arranged to traverse the upper bore 11 in frictional sealing contact with the cylinder wall 15 in response to main operating signal pressures from signal inlet Ps at the top of the body. Such signal pressures are supplied through a duct 48 into the chamber 22 on one side of diaphragm 23 so as to displace the diaphragm and its connected disc 24 against the biasing action of the regulating compression spring 26. The coiled compression of the spring 26 may be regulated by threaded adjustments of the disc plug 30.

Figure 2:
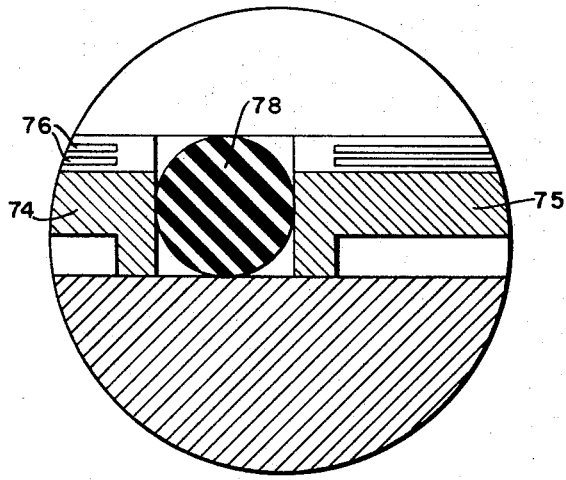
FIGURE 2 is an enlarged view of the diverter valve O-ring and slotted spacer spool structure in cross section taken of the encircled area of FIGURE 1.
Figure 3:
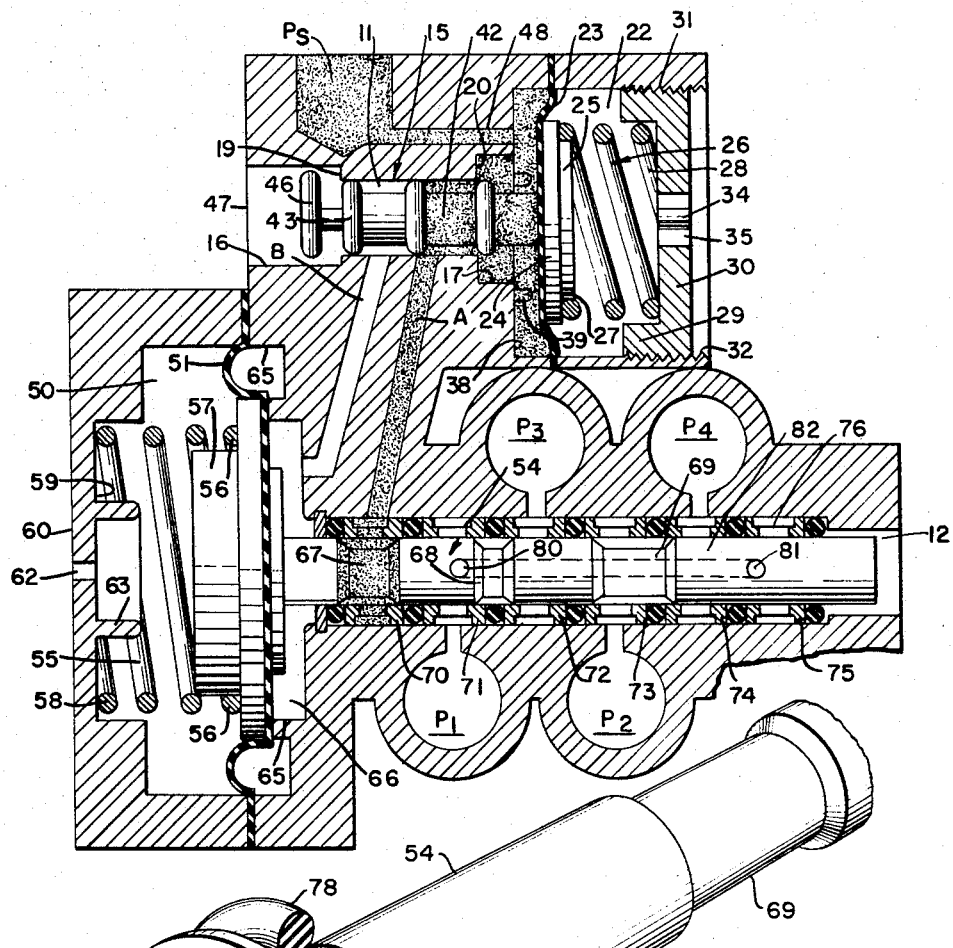
FIGURE 3 is a cross section view of the device shown at the start of the active cycle with the disc of the signal valve assembly moving away from the valve stops in the signal pressure chamber to transfer activation to the diverting valve assembly in the lower part of the device.

In the inactive or idle position of the relay spool valve means 42, the disc 24 will be engaged with the stops 39 on the wall of the chamber 22 at the left side of the diaphragm 23, see FIGURE 1, and in the active position of the relay spool, the disc 24 disengages from the stop 39, see FIGURES 2 and 3. The left wall of the body 10 opposite to the end 46 of the valve means 42 is formed with an aperture 47 to vent the counterbore at this end to atmosphere, see FIGURE 1, while sealing ring 45 of the relay spool valve means 42, seals out the flow of fluid from the inlet Ps and chamber 22.

The relatively small central cylinder 15 of the upper transverse bore 11 has openings therein from connection with spaced signal channels A and B interconnecting with the valve assemblies of the unit and their respective pressure chambers. These channels are controlled by the positions of the relay spool of signal valve 42 which is formed with sealing rings 43, 44, and 45 as hereinafter explained in detail when describing the cycle of operation of the signal valve and the diverting valve of this pneumatic diverting relay combination, see FIGURES 1, 2, 3, 4 and 5.

The signal channel A leads to the lower transverse bore 12 of the body and the signal channel B leads to a chamber 50 divided by a diaphragm 51 connected to a disc 52 carried by an elongated spool valve 54 extending through the lower bore 12.

This valve assembly discs 52 is similar to the signal valve assembly disc 24 in the signal pressure chamber 22 of the upper bore 11 and centers a coil compression spring 55 with its end coil 56 seated against the disc 52 around a concentric button 57 and its opposite end coil 58 sealed on an annular surface 59 of the outer wall 60 of the chamber 50 for fast action of diverting valve 54. The interior of the wall 60 is centrally formed with a vent hole 62 to atmosphere and around the vent hole is an inwardly extending collar 63 adapted to serve as a valve stop by engaging with the oppositely positioned button 57 projecting from disc 52, if the spring 55 is over-compressed.

The opposite side of the disc 52 at its peripheral face also engages an annular valve stop 65 formed around a valve cavity or an enlarged area 66 leading to the lower valve bore 12, see FIGURES 1, 2, and 3, prior to fast-action of the valve assembly shown in FIGURE 3. This area 66 connects with the lower end of the signal pressure channel B from the upper valve bore 11.

The pressure in the chamber 50 coming from channel B controls the movements of the diverting valve of the lower valve assembly, which comprises an elongated shaft mounted within spacer spools 70, 71, 72, 73, 74 and 75, see FIGURE 1. These spacer spools encompass reduced sections 67, 68 and 69 of the diverting spool valve 54. Each of these spacer spools are formed with annularly spaced longitudinal slots 76, see enlarged sectional FIGURE 2, for air flow therethrough to outlets P1, P2, P3 and P4 and each spacer is in turn kept in spaced relation by O-rings 78, see FIGURE 1.

As believed understood from the above description, the signal pressure valve assembly in the upper portion of the body initiates activation of the diverting valve assembly in the lower portion of the body, which lower diverting valve controls the multi-way flow of the branch pressure of outlet ports P1, P2, P3 and P4, from the signal pressure Ps to the signal pressure relay valve.

Figure 5:
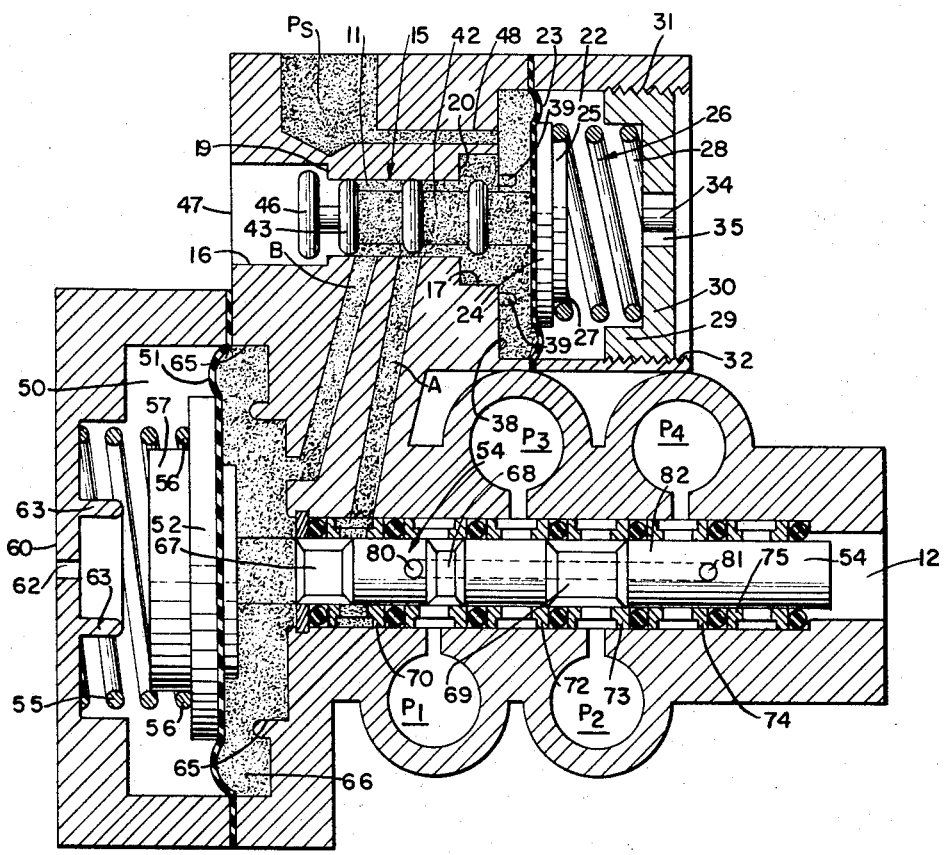
FIGURE 5 illustrates a continuous pressure build-up from the pressure source to provide the snap-action condition of the diverter valve in the lower portion of the casing.

The signal pressure valve 42 functions as a modulating unit and moves slowly as signal pressure Ps develops to overcome the spring 26 and the diverting valve 54 and its assembly is spring loaded so as to be fast acting during certain periods of valve activation, see FIGURE 5, which shows the fast action condition of the diverter valve. For example, a cycle of operation from idle see FIGURE 1 through active periods see FIGURES 3, 5 and 6 and return to idle, see FIGURE 7, is as follows:

*Inactive or deactivated position*

With no signal pressure at Ps, the control is in a deactivated position so the lower control valve assembly connects P1 to P3 and P2 to P4, see FIGURE 1.

The upper signal valve assembly has its spool and seal rings 43, 44 and 45 so positioned as to vent signal channels A and B to the atmosphere through port 47, thereby giving no opposition to the valve return spring 26, thus holding the control or diverting valve assembly 54 in the deactivated idle position shown in FIGURE 1, which deactivated position connects P1 to P3 and P2 to P4. For example, air passing from P1 flows through the slots 76 in the aligned spacer with P1 through the cavity defined by the reduced section 68 of the spool in the diverting spool valve 54 and through the adjacent O-ring 78, allowing fluid, that is, air seepage into the spacer slots 76 aligned with P3, thereby connecting P1 with P3.

P2 is connected to P4 through the slots of the spacer aligned with P2 and flow of air continues to the cavity provided by the reduced section 69 in the diverting valve 54. This spool formed cavity 69 aligns with the respective adjacent spacers and by-passes the O-ring adjacent thereto, permitting flow through the spacer slots 76 and into P4.

The control device is activated by the signal pressure intake at Ps. When signal pressure is supplied, sealing ring 45 of the signal valve 42 closes off the signal valve cylinder 15, building up pressure in chamber 22, see FIGURES 3 and 4. As pressure builds up, the signal valve assembly 42 moves away from the valve stops 39 in the chamber 22, compressing the regulating compression spring 26, see FIGURE 4.

As the signal pressure continues to increase the signal valve assembly 42 continues to travel and sealing ring 45 is repositioned, thus allowing air passage around it, thereby filling signal pressure channel A, see FIGURE 6. This causes the channel A to become a common signal pressure channel. When this takes place signal channel B is sealed off by sealing ring 44. Then as the signal pressure continues to build up, see FIGURE 4, the signal valve assembly continues to move, causing sealing ring 44 to be above the opening to signal channel A, see FIGURE 4. Some seepage is allowed around the sealing ring 44 and into signal pressure channel B, sealed by sealing ring 43, thereby slowly building up pressure in signal channel B.

Continued signal pressure increase induces additional valve travel, to thereby cause sealing ring 44 to be positioned across pressure signal channel A and permitting signal pressure to enter signal pressure channel B through which signal pressure is supplied to actuate the diverting valve 54 through the build up of pressure in the diverting valve cavity 66. This pressure build up compresses the valve return spring 55 moving the diverting valve assembly. This movement causes the diverting valve assembly disc 52 to clear the valve stop 65 thus enlarging the valve cavity 66 and the diverting valve assembly 54 is slightly moved.

This slight movement of the diverting valve assembly is so calculated as to clear the adjacent O-ring and permit rapid passage of pressure to the reduced section 67 of the diverting valve spool and channel A into the cavity 66. Such rapid pressure increases in the valve cavity 66 causes a fast action by overcoming the low rate valve return spring 55, see FIGURE 5.

At this point of operation the valve cavity 66 and the signal pressure channels A and B are common with the pressure at the signal inlet Ps. As this condition continues, the diverting valve 54 maintains this activated position. While in this active position P1 is connected to P4 via air passages or slots through the spacer spool aligned with P1 continuing through the orifice 80 of the interior valve channel 82 also aligned with the respective slotted spacer spool. This channel 82 extends from orifice 80 to 81, see FIGURE 5.

The interior valve channel 82 permits passage of air through the orifice 81 aligned with the slotted spacer spool 74 aligned with P4, thus connecting P1 and P4 as in FIGURES 5 and 6.

P2 is connected with P3 with air passage from P2 into reduced section 69 of the diverting valve spool 54 through the spacer spool aligned with P2 through the adjacent O-ring into the next adjacent slotted spacer spool 72 aligned with P3, thus connecting P2 to P3. As the signal pressure continues to increase or build up, the valve stop 63 in the vented wall 59 of the chamber 50 prevents the valve assembly 54 from further movement. The diverting valve 54 thus maintains the position connecting P1 to P4 and P2 to P3, until the signal pressure decreases enough for the compression spring 26 to move the signal valve 42 assembly in the upper portion of the body toward the valve stops 39 in the chamber 22, see FIGURE 6.

The diverting valve 54 maintains the same position connecting P1 to P4 and P2 to P3, until the compression spring 26 pushes the signal valve assembly to the point where the sealing ring 43 permits air passage to atmosphere, as shown in FIGURE 7. At the same instant the sealing ring 44 is between signal channels A and B and sealing ring 45 seals off the signal valve chamber 22, see FIGURE 7.

In this position the air in channel A passes very rapidly through the slotted spacer spool aligned with channel A, by the adjacent O-ring, through reduced section 67 of the diverting valve 54 into the valve cavity 66, through channel B to the atmosphere vent 47 in the upper portion of the body. At this instant the diverting valve return spring 55 pushes the diverting valve disc 52 against the stops 65 in the valve cavity 66 in the chamber 50, thereby positioning the diverting valve by fast-action from the position of FIGURE 7 to the deactivated position of FIGURE 1, whereby P1 is connected to P3 and P2 connected to P4.

The foregoing steps of operation thus complete the start to finish cycle of the relay, that is, from the deactivated position of FIGURE 1 to the activated position of FIGURE 6 and back to the start or the the deactivated position.

By adjusting the regulating adjustment 30, the diverting relay may continue to cycle at a suitable or desired pressure by means of inactive or active signal pressures supplied at source Ps.

A three way diverting relay may be provided by either plugging or venting to atmosphere one of the undesired ports.

Thus there is provided a single body carried intercoupled arrangement of novel valve assemblies producing a pneumatic fast acting diverting relay commanded by a signal pressure activating spring loaded valve, wherein the relay includes a novel second spring loaded valve activated by the first valve to control a multi-way flow of air from three or more ports.

What is claimed is:
1. In a body having upper and lower portions,
a pneumatic signal pressure responsive valve assembly in the upper portion of the body and a signal output diverter valve assembly in the lower portion of the body, said respective valve assemblies being operatively connected by signal channels formed in the body portion,
said signal valve assembly comprising:
a spool valve in said upper portion of the body,
said signal spool valve having a plurality of spaced valve rings for controlling signal pressure transfer through the signal channels to the said diverter valve assembly in the said lower portion of the body,
each of said valve rings serving to control the signal pressure to said diverter valve assembly,
said diverter valve assembly comprising:
a multisection elongated spool valve including reduced areas,
a plurality of slotted spools mounted axially on said diverter spool valve,
said multisecond spool valve extending through the aligned bores of the said slotted valve spools,
said slotted spools being fixed with respect to changeable positions of the reduced areas of said multisection spool valve,
a plurality of outlet ports selectively connecting in response to signal pressure transfer from said signal valve, and
pressure chambers at an end of each respective valve assembly in the respective upper and lower portions of the body providing activation of said respective valve assemblies as a function of signal pressure initiated in the signal valve assembly chamber.
2. The device as described in claim 1, wherein:
said respective chambers are each divided by a pressure responsive diaphragm, with a wall of the chamber open to signal input pressure on one side thereof,
a spring engaging the opposite side of the diaphragm, said diaphragm being spring biased by the said spring against signal pressure on the opposite side of the same to said spring.
3. The device as described in claim 2, including stop means engageable with each opposed limit of movement of said respective valve assemblies.

References Cited

UNITED STATES PATENTS

| | | | |
|---|---|---|---|
| 2,146,176 | 2/1939 | Donaldson | 91—461 |
| 2,266,533 | 12/1941 | Brisbane et al. | 137—625.63 X |
| 3,003,475 | 10/1961 | Rouvalis | 91—461 X |
| 3,131,722 | 5/1964 | Abbott et al. | 137—625.6 |

FOREIGN PATENTS

| | | |
|---|---|---|
| 1,196,890 | 6/1959 | France. |

ARNOLD ROSENTHAL, *Primary Examiner.*

U.S. Cl. X.R.

251—28